United States Patent
Ando et al.

(10) Patent No.: US 9,575,608 B2
(45) Date of Patent: Feb. 21, 2017

(54) TOUCH PANEL

(71) Applicant: Murata Manufacturing Co., Ltd., Nagaokakyo-shi, Kyoto-fu (JP)

(72) Inventors: Masamichi Ando, Nagaokakyo (JP); Takafumi Inoue, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 0 days.

(21) Appl. No.: 14/661,118

(22) Filed: Mar. 18, 2015

(65) Prior Publication Data

US 2015/0193055 A1 Jul. 9, 2015

Related U.S. Application Data

(63) Continuation of application No. PCT/JP2013/073467, filed on Sep. 2, 2013.

(30) Foreign Application Priority Data

Sep. 20, 2012 (JP) ................. 2012-206407

(51) Int. Cl.
*G06F 3/044* (2006.01)
*G01B 7/00* (2006.01)

(52) U.S. Cl.
CPC ............. *G06F 3/044* (2013.01); *G01B 7/003* (2013.01); *G01B 2210/58* (2013.01); *G06F 2203/04105* (2013.01)

(58) Field of Classification Search
CPC ................... G06F 3/044; G06F 3/0414; G06F 2203/04105; G06F 2203/04106; G01B 7/003; G01B 2210/58
(Continued)

(56) References Cited

U.S. PATENT DOCUMENTS

| | | | |
|---|---|---|---|
| 7,825,911 B2* | 11/2010 | Sano | G06F 3/041 178/18.01 |
| 2009/0002199 A1* | 1/2009 | Lainonen | H03K 17/964 341/20 |

(Continued)

FOREIGN PATENT DOCUMENTS

| | | |
|---|---|---|
| EP | 2442213 A1 | 4/2012 |
| JP | H05-61592 A | 3/1993 |

(Continued)

*Primary Examiner* — Tom Sheng
(74) *Attorney, Agent, or Firm* — Arent Fox LLP

(57) ABSTRACT

A touch panel that includes a dielectric film and a piezoelectric film. A first capacitance detection electrode is disposed on an upper main surface of the dielectric film, a second capacitance detection electrode and a first piezoelectric voltage detection electrode are disposed between a lower main surface of the dielectric film and an upper main surface of the piezoelectric film, and a second piezoelectric voltage detection electrode is disposed on a lower main surface of the piezoelectric film. The first capacitance detection electrode includes plural sub-electrodes extending in a first direction, the second capacitance detection electrode includes plural sub-electrodes extending in a second direction orthogonal to the first direction, and the first piezoelectric voltage detection electrode includes plural sub-electrodes disposed between the plural sub-electrodes.

11 Claims, 11 Drawing Sheets

(58) Field of Classification Search
USPC .......................................................... 345/173
See application file for complete search history.

(56) References Cited

U.S. PATENT DOCUMENTS

| | | |
|---|---|---|
| 2009/0309616 A1 | 12/2009 | Klinghult et al. |
| 2011/0102370 A1 | 5/2011 | Kono |
| 2011/0141052 A1* | 6/2011 | Bernstein ................ G06F 3/016 345/174 |
| 2011/0157087 A1* | 6/2011 | Kanehira .............. G06F 3/0414 345/174 |
| 2012/0062245 A1* | 3/2012 | Bao ........................ H01L 29/84 324/661 |
| 2012/0075226 A1 | 3/2012 | Andoh |
| 2014/0152618 A1* | 6/2014 | Ando ..................... G06F 3/044 345/174 |
| 2014/0292699 A1* | 10/2014 | Ando .................... G06F 3/0414 345/173 |
| 2015/0042590 A1* | 2/2015 | Ando ..................... G06F 3/041 345/173 |
| 2015/0185955 A1* | 7/2015 | Ando ..................... G06F 3/041 345/174 |

FOREIGN PATENT DOCUMENTS

| | | |
|---|---|---|
| JP | 2010-108490 A | 5/2010 |
| WO | WO 2010/143528 A1 | 12/2010 |
| WO | WO 2013/021835 A1 | 2/2013 |

\* cited by examiner

TOUCH PANEL

CROSS REFERENCE TO RELATED APPLICATIONS

The present application is a continuation of International application No. PCT/JP2013/073467, filed Sep. 2, 2013, which claims priority to Japanese Patent Application No. 2012-206407, filed Sep. 20, 2012, the entire contents of each of which are incorporated herein by reference.

FIELD OF THE INVENTION

The present invention relates to a touch panel that can detect a position pressed by fingers or the like and a pressing amount upon the pressing operation.

BACKGROUND OF THE INVENTION

Various types of touch panels that simultaneously detect a touch position when an operator touches a planar operation surface with his/her finger or the like and a pressing amount upon the touch have conventionally been proposed. For example, Japanese Unexamined Patent Publication No. 05-61592 (Patent Document 1) describes a touch input device having a structure in which a flat-plate pressure sensor and a touch panel detecting a touch position are superimposed in close contact with each other. This touch input device detects a touch position with the touch panel. On the other hand, a pressing amount is detected by the pressure sensor that is formed separate from the touch panel and superimposed on the touch panel.

Patent Document 1: Japanese Unexamined Patent Publication No. 05-61592

SUMMARY OF THE INVENTION

The touch input device described in Patent Document 1 uses the touch panel and the pressure sensor for detecting a touch position and a pressing amount respectively, wherein the touch panel and the pressure sensor have to be superimposed with each other. Therefore, the thickness of the touch input device becomes equal to or more than the total of the thickness of the touch panel and the thickness of the pressure sensor, and hence, the touch input device is difficult to be formed to be thin.

Accordingly, an object of the present invention is to provide a touch panel that can detect a touch position and a pressing amount, and can be formed to be thin.

A touch panel according to the present invention includes a dielectric film having a first main surface and a second main surface, which are opposite to each other, and a piezoelectric film having a third main surface and a fourth main surface, which are opposite to each other, the piezoelectric film being superimposed on the dielectric film with the third main surface and the second main surface being opposite to each other.

A first capacitance detection electrode is disposed on the first main surface of the dielectric film. Between the second main surface of the dielectric film and the third main surface of the piezoelectric film, a second capacitance detection electrode paired with the first capacitance detection electrode is disposed, and a first piezoelectric voltage detection electrode is also disposed. In addition, a second piezoelectric voltage detection electrode paired with the first piezoelectric voltage detection electrode is disposed on the fourth main surface of the piezoelectric film.

The first capacitance detection electrode includes plural first capacitance detection sub-electrodes that extend in a first direction and are disposed with a space in a second direction crossing the first direction on the first main surface, and the second capacitance detection electrode includes plural second capacitance detection sub-electrodes that extend in the second direction and are disposed with a space in the first direction between the second main surface and the third main surface.

The first piezoelectric voltage detection electrode includes plural first piezoelectric voltage detection sub-electrodes that extend in the second direction and are disposed between the plural second capacitance detection sub-electrodes between the second main surface and the third main surface. The second piezoelectric voltage detection electrode has a shape opposing the first piezoelectric voltage detection electrode via the piezoelectric film.

The touch panel having the above configuration according to the present invention uses the first main surface of the dielectric film as an operation surface, and when an operator touches this surface, capacitance at the touch position is changed. The change in the capacitance is extracted by the first capacitance detection electrode and the second capacitance detection electrode which are located so as to sandwich the dielectric film therebetween, whereby the touch position is detected.

Simultaneously, a piezoelectric voltage is extracted by the first piezoelectric voltage detection electrode and the second piezoelectric voltage detection electrode which are located so as to sandwich the piezoelectric film therebetween. Since the piezoelectric voltage depends on a pressing amount, the pressing amount can be detected from the piezoelectric voltage.

As described above, the touch position and the pressing amount can be detected by at least two films and the electrodes disposed on the main surfaces of the both films, whereby the touch panel can be formed to be thin.

Preferably, the first capacitance detection sub-electrode and the second capacitance detection sub-electrode both have a shape including plural wide parts and plural narrow parts, which are alternately formed continuous, the narrow parts of the first capacitance detection sub-electrode and the narrow parts of the second capacitance detection sub-electrodes being located to be opposite to each other via the dielectric film. This configuration can prevent the wide parts with a wider area of each of the first capacitance detection sub-electrodes and the second capacitance detection sub-electrodes from being superimposed with each other as viewed from the direction orthogonal to the operation surface. Therefore, when an operator touches the operation surface with his/her finger or the like, a change in capacitance due to a change in dielectric constant in the vicinity of the operation surface is likely to occur, resulting in that detection sensitivity of the touch position can be enhanced.

More preferably, in the above preferable embodiment, a portion of the first piezoelectric voltage detection sub-electrode is located in a region narrower than a region of the wide part of the first capacitance detection sub-electrode as perspectively viewed, the portion being opposite to the wide part of the first capacitance detection sub-electrode. With this configuration, the first piezoelectric voltage detection sub-electrode is disposed behind the wide part of the first capacitance detection sub-electrode, whereby the first piezoelectric voltage detection sub-electrode can be separated from between the first capacitance detection sub-electrode and the second capacitance detection sub-electrode. Consequently, this configuration can prevent the first piezoelectric voltage detection sub-electrode from affecting a change in capacitance.

In the above preferable embodiment, the first piezoelectric voltage detection sub-electrode also has a shape including plural wide parts and plural narrow parts, which are alternately formed continuous, and the wide part of the first piezoelectric voltage detection sub-electrode is located between the narrow parts of the adjacent second capacitance detection sub-electrodes, whereby the wide part of the first capacitance detection sub-electrode and the wide part of the first piezoelectric voltage detection sub-electrode are located to be opposite to each other via the dielectric film. According to this configuration, necessary electrodes can efficiently be disposed on the dielectric film and the piezoelectric film, which have a limited area.

In the above preferable embodiment, the wide part of the first piezoelectric voltage detection sub-electrode preferably includes a region where no electrode is formed. This configuration can reduce an area where the first piezoelectric voltage detection sub-electrode opposes the first capacitance detection sub-electrode and the second piezoelectric voltage detection sub-electrode, whereby an area where three electrode layers are overlapped is reduced. Accordingly, reduction in light transmittance at this portion can be suppressed.

More preferably, in the above preferable embodiment, the wide part has a shape of parallelogram, and the narrow part has a shape of connecting the corners of the plural parallelogram-shaped wide parts in a direction of a diagonal, in each of the first capacitance detection sub-electrode, the second capacitance detection sub-electrode, and the first piezoelectric voltage detection sub-electrode. According to this configuration, necessary electrodes can more efficiently be disposed, and the second capacitance detection sub-electrodes and the first piezoelectric voltage detection sub-electrodes, which are disposed between the second main surface and the third main surface, can be formed almost without a gap.

In the present invention, the second piezoelectric voltage detection electrode may be composed of one electrode opposing all of the plural first piezoelectric voltage detection sub-electrodes, or may be composed of plural divided second piezoelectric voltage detection sub-electrodes. The former case has an advantage of easy patterning of the second piezoelectric voltage detection electrode. The former case also has an advantage such that the second piezoelectric voltage detection electrode functions as a shield for preventing electromagnetic noise from a device to which the touch panel according to the present invention is mounted. On the other hand, in the latter case, even if the entire perimeter of the piezoelectric film is fixed, each region on which each of the plural divided second piezoelectric voltage detection sub-electrodes is formed is in the status in which its entire perimeter is not fixed. Therefore, a disadvantage in which a detection voltage by the piezoelectric voltage detection electrode is offset can be prevented, the disadvantage being generated when the entire perimeter of the piezoelectric film is fixed.

In the present invention, the piezoelectric film is preferably made of polylactic acid. Polylactic acid subjected to uniaxial stretching has a high piezoelectric constant and a low dielectric constant. Therefore, it has high detection sensitivity to a pressing amount by a touch, and also has high detection sensitivity to a change in capacitance caused by a touch. Accordingly, both a touch position and a pressing amount can be detected with high accuracy. Similar to acryl resin, polylactic acid has high transparency, whereby a touch panel having high transparency can be realized. Since polylactic acid has no pyroelectricity, it does not affect the detection voltage of the pressing amount (pressing force) even if a body temperature is transmitted when fingers or the like are in contact with the surface of the touch panel. Accordingly, the touch panel using polylactic acid for the material of the piezoelectric film does not need to additionally include a complicated mechanism for indirectly transmitting pressing force so as not to transmit a body temperature, compared to the configuration in which a piezoelectric film having pyroelectricity made of polyvinylidene fluoride (PVDF) or the like is used.

According to the present invention, a touch panel that can detect a touch position and a pressing amount and can be formed to be thin can be implemented.

DETAILED DESCRIPTION OF THE INVENTION

A touch panel 1 according to one embodiment of the present invention will be described with reference to FIGS. 1 to 5.

Figure 5:
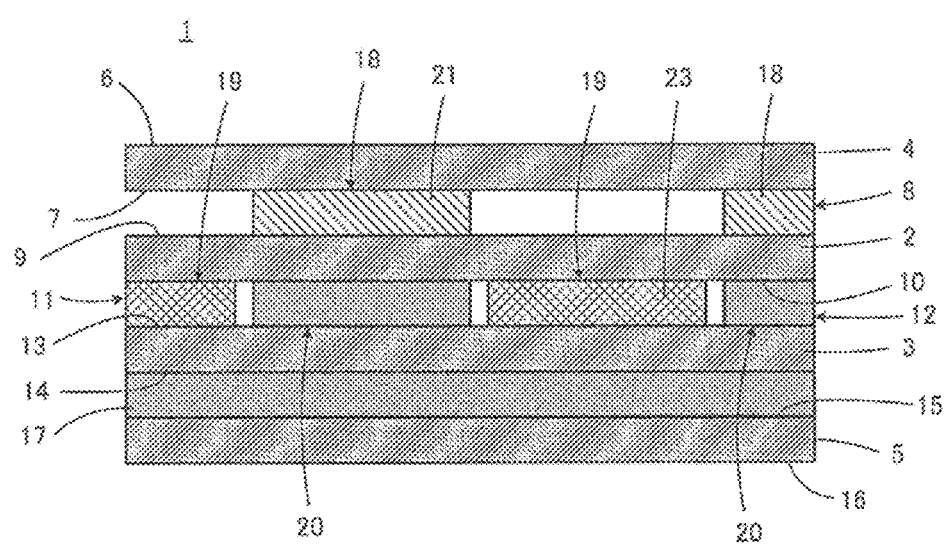
FIG. 5 is a sectional view taken along a line A-A in FIG. 1 and graphically illustrating a layer structure of the touch panel 1 illustrated in FIG. 1.

As well illustrated in FIG. 5, the touch panel 1 includes at least a dielectric film 2 and a piezoelectric film 3. In this embodiment, the touch panel 1 also includes an upper protection film 4 and a lower protection film 5. The upper protection film 4, the dielectric film 2, the piezoelectric film 3, and the lower protection film 5 are stacked in this order from top in the touch panel 1.

Figure 2:
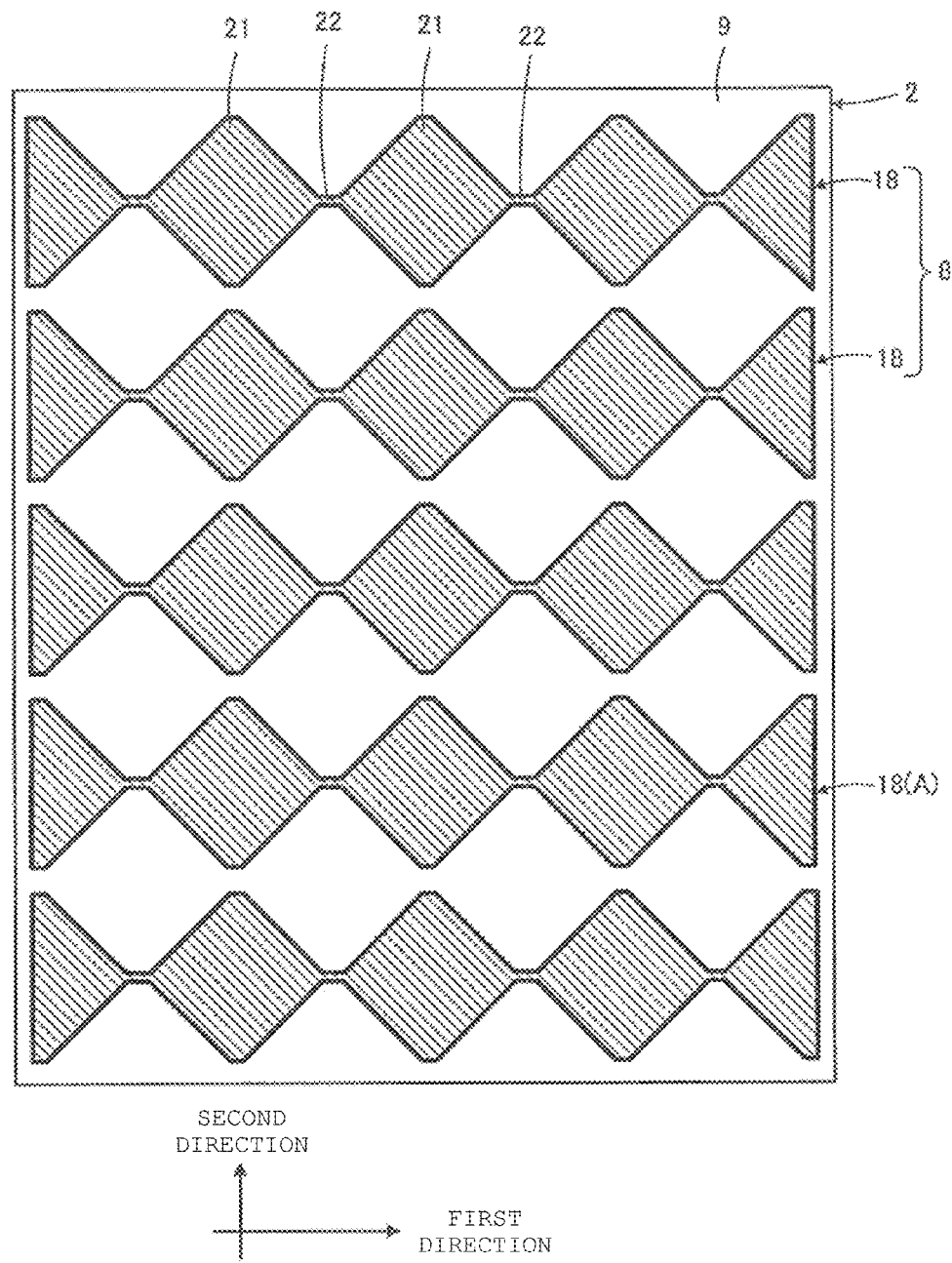
FIG. 2 is a plan view illustrating the first capacitance detection electrode 8 of the touch panel 1 illustrated in FIG. 1.

An upper main surface 6 of the upper protection film 4 becomes an operation surface touched with operator's fingers or the like. A first capacitance detection electrode 8 is formed on a lower main surface 7 of the upper protection film 4 with a pattern as illustrated in FIG. 2.

Figure 3:
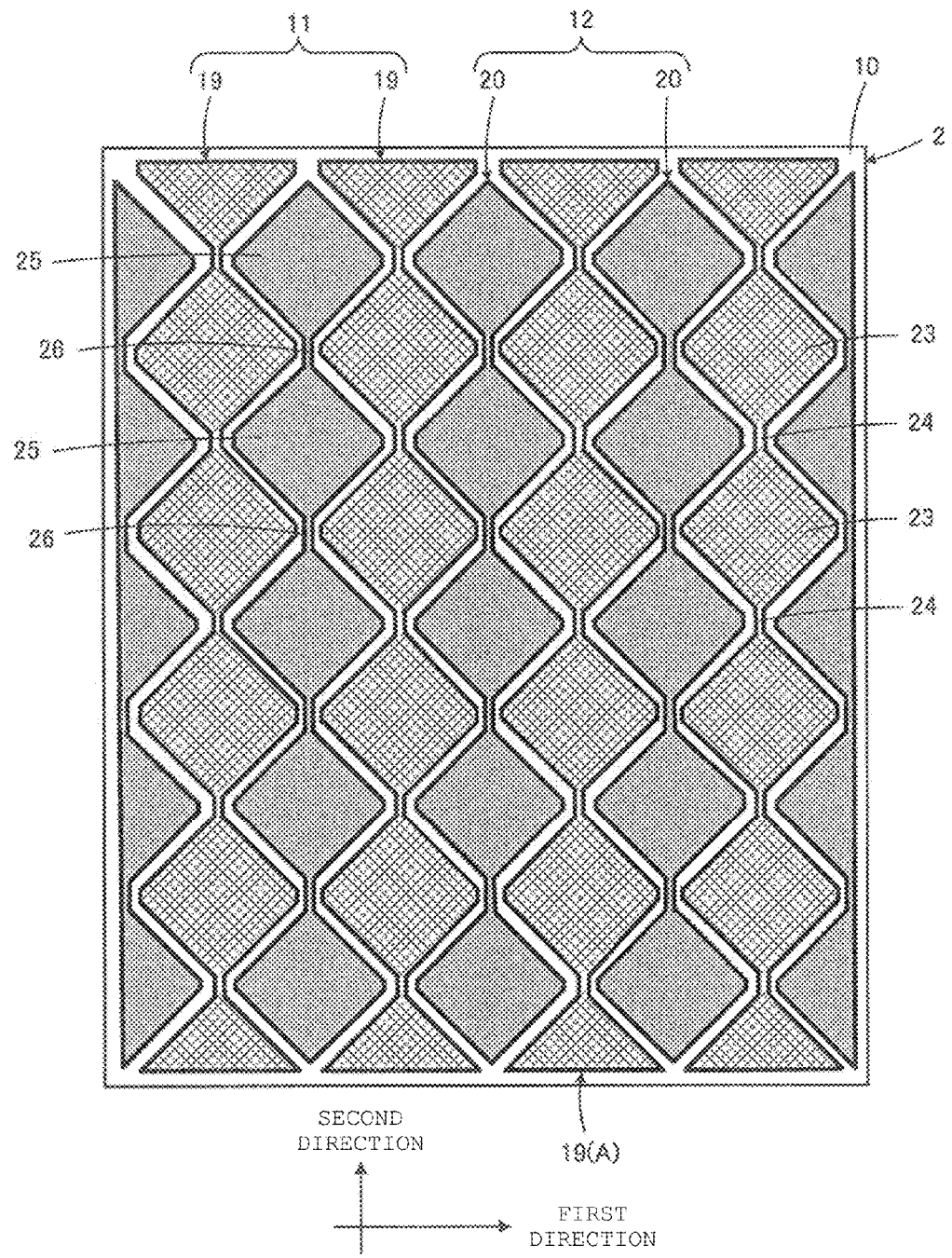
FIG. 3 is a plan view illustrating the second capacitance detection electrode 11 and a first piezoelectric voltage detection electrode 12 of the touch panel 1 illustrated in FIG. 1.

An upper main surface 9 of the dielectric film 2 is opposite to the lower main surface 7 of the upper protection film 4 via the first capacitance detection electrode 8. A second capacitance detection electrode 11 and a first piezoelectric voltage detection electrode 12 are formed on the lower main surface 10 of the dielectric film 2 with respective patterns as illustrated in FIG. 3.

An upper main surface 13 of the piezoelectric film 3 is opposite to the lower main surface 10 of the dielectric film 2 via the second capacitance detection electrode 11 and the first piezoelectric voltage detection electrode 12. A lower main surface 14 of the piezoelectric film 3 is opposite to an upper main surface 15 of the lower protection film 5.

Figure 4:
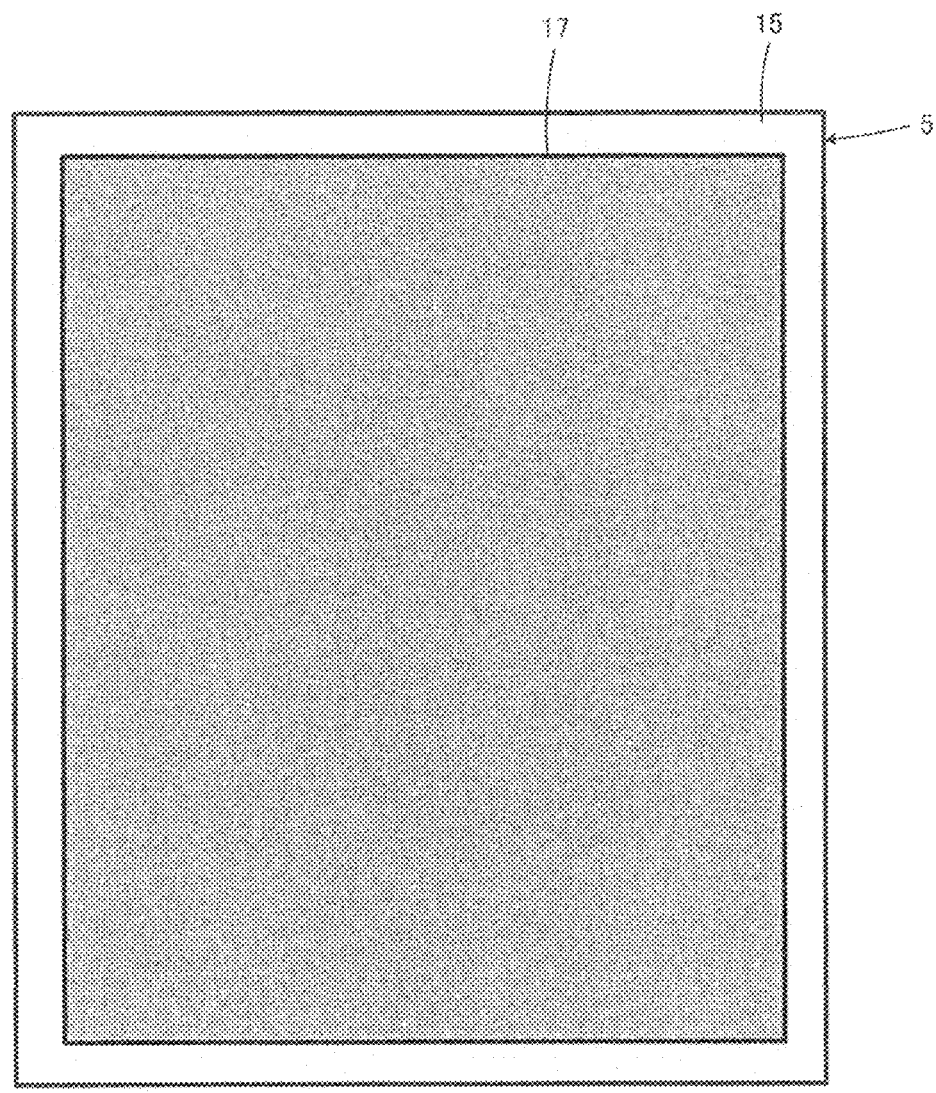
FIG. 4 is a plan view illustrating a second piezoelectric voltage detection electrode 17 of the touch panel 1 illustrated in FIG. 1.

A second piezoelectric voltage detection electrode 17 is formed on the upper main surface 15 of the lower protection film 5 with a pattern as illustrated in FIG. 4. A lower main surface 16 of the lower protection film 5 faces a device (not illustrated) to which this touch panel 1 is mounted.

A material and thickness of each of the upper protection film 4, the dielectric film 2, the piezoelectric film 3, and the lower protection film 5 are selected such that these films can be deformed to dent with a pressing operation by an operator with his/her fingers or the like. According to need, each of the upper protection film 4, the dielectric film 2, the piezoelectric film 3, and the lower protection film 5 is made of a light-transparent material. In this case, it is preferable that the first capacitance detection electrode 8, the second capacitance detection electrode 11, the first piezoelectric voltage detection electrode 12, and the second piezoelectric voltage detection electrode 17 is also made of a material having high light transparency.

In a more specific embodiment, the dielectric film 2 is made of polyethylene terephthalate (PET), polyethylene naphthalate (PEN), or polypropylene (PP). The piezoelectric film 3 is made of a piezoelectric resin material such as poly(L-lactic) acid (PLLA). The protection films 4 and 5 are made of PET, PEN, or PP. For example, ITO, ZnO, polythiophene, polyaniline, silver nanowire, or carbon nanotube is used as materials of the first capacitance detection electrode 8, the second capacitance detection electrode 11, the first piezoelectric voltage detection electrode 12, and the second piezoelectric voltage detection electrode 17. Vapor deposition, sputtering, or plating is applied to form the electrodes made of these materials.

As to especially PLLA forming the piezoelectric film 3, PLLA is chiral polymer in which a main chain has a spiral structure. When molecules are aligned due to uniaxial stretching, PLLA exhibits piezoelectricity. The piezoelectric constant of the uniaxially-stretched PLLA belongs to a very high class among piezoelectric constants of various polymers.

A stretching ratio for PLLA is preferably about three to eight times. When a heat treatment is performed after stretching, crystallization of extended chain crystals of polylactic acid is encouraged, whereby the piezoelectric constant is enhanced. In the case where biaxial stretching is performed, the effect similar to the uniaxial stretching can be obtained by performing stretching in each axial direction with different stretching ratios. For example, in the case where stretching is performed in a certain direction that is defined as an X-axis direction by eight times, and stretching is performed in an Y-axis direction that is orthogonal to the X axis by two times, the similar effect to the case where uniaxial stretching is performed in the X axis direction by about four times can be obtained for a piezoelectric constant. A film simply formed with uniaxial stretching has a drawback of being likely to be split along the direction of the stretching axis. However, this drawback can be solved to some extent by the execution of biaxial stretching.

In addition, PLLA has piezoelectricity due to an alignment process of molecules with stretching or the like, so that a polling treatment that is needed for other polymers such as PVDF or piezoelectric ceramic is not needed. Specifically, piezoelectricity of PLLA that does not belong to ferroelectric appears not by ion polarization as in ferroelectric such as PVDF or PZT, but by a spiral structure that is a unique structure of molecules. Therefore, PLLA has less pyroelectricity that is generated in other ferroelectric piezoelectric bodies. In addition, the piezoelectric constant of PLLA is extremely stable overtime, although PVDF, for example, has a variation overtime in a piezoelectric constant, and in some cases, the piezoelectric constant is significantly reduced.

PLLA also has a very low relative permittivity such as about 2.5. Therefore, when d is defined as a piezoelectric constant, and $\in^T$ is defined as a dielectric constant, a piezoelectric output constant (=piezoelectric g constant, $g=d/\in^T$) becomes a large value.

A piezoelectric g constant of PVDF having a dielectric constant of $\in_{33}{}^T=13\times\in_0$ and a piezoelectric constant of $d_{31}=25$ pC/N becomes $g_{31}=0.2172$ Vm/N from the above equation. On the other hand, a piezoelectric g constant of PLLA having a piezoelectric constant of $d_{14}=10$ pC/N in terms of $g_{31}$ becomes $g_{31}=0.2258$ Vm/N, since $d_{31}=5$ pC/N due to $d_{14}=2\times d_{31}$. Therefore, PLLA having the piezoelectric constant of $d_{14}=10$ pC/N can provide satisfactory detection sensitivity for a pressing amount same as detection sensitivity provided by PVDF. The present inventor has experimentally obtained PLLA having the piezoelectric constant of $d_{14}=15-20$ pC/N, and by using this PLLA, a pressing amount can be detected with higher sensitivity.

In addition, different from popular ferroelectrics providing a high piezoelectric constant, PLLA has a low dielectric constant as described above. Therefore, an electric field confinement effect is low between the first capacitance detection electrode 8 disposed on the upper main surface 13 of the piezoelectric film 3 and the second capacitance detection electrode 11 disposed on the lower main surface 14. Accordingly, if a dielectric such as a finger externally approaches the piezoelectric film 3, capacitance is likely to change. Specifically, detection sensitivity for a change in capacitance is enhanced.

Notably, polylactic acid (PLA) is a polymer produced by dehydration synthesis, and it can be produced by ring-opening polymerization to lactide that is a cyclic dimer of lactic acid. Since lactic acid contains asymmetric carbon, it has chirality. Therefore, PLA has L-form and D-form, and a polymer of L-form is referred to as poly(L-lactic) acid (PLLA), and a polymer of D-form is referred to as poly(D-lactic) acid (PDLA). A main chain of PLLA has a counterclockwise spiral structure, while a main chain of PDLA has a clockwise spiral structure. Whether PLA has L-form or D-form is determined depending on a type of microorganisms such as organisms used in a synthesis process of lactic acid. Most of PLA currently mass-produced and used is PLLA. Therefore, PLLA is used for the material of the piezoelectric film 3 in the above embodiment. However, the same can apply to the case in which PDLA is used.

In the process of producing the touch panel 1, the upper protection film 4, the dielectric film 2, the piezoelectric film 3, and the lower protection film 5 are bonded to one another via, for example adhesive. As a result, the first capacitance detection electrode 8 is disposed between the lower main surface 7 of the upper protection film 4 and the upper main surface 9 of the dielectric film 2, the second capacitance detection electrode 11 and the first piezoelectric voltage detection electrode 12 are disposed between the lower main surface 10 of the dielectric film 2 and the upper main surface 13 of the piezoelectric film 3, and the second piezoelectric voltage detection electrode 17 is disposed between the lower main surface 14 of the piezoelectric film 3 and the upper main surface 15 of the lower protection film 5.

Different from the above forming method, the first capacitance detection electrode 8 may be formed on the upper main surface 9 of the dielectric film 2, and at least one of the second capacitance detection electrode 11 and the first piezoelectric voltage detection electrode 12 may be formed on the upper main surface 13 of the piezoelectric film 3, and the second piezoelectric voltage detection electrode 17 may be formed on the lower main surface 14 of the piezoelectric film 3. However, in the case where at least one of the second capacitance detection electrode 11 and the first piezoelectric voltage detection electrode 12, or the second piezoelectric voltage detection electrode 17 is formed on the piezoelectric film 3 made of PLLA, a treatment for enhancing adhesion property of electrodes is needed, since the surface of PLLA is inactive.

Next, the detail of the pattern of each of the first capacitance detection electrode 8, the second capacitance detection electrode 11, the first piezoelectric voltage detection electrode 12, and the second piezoelectric voltage detection electrode 17 will be described.

As illustrated in FIG. 2, the first capacitance detection electrode 8 has plural first capacitance detection sub-electrodes 18 on the upper main surface 9 of the dielectric film 2, the first capacitance detection sub-electrodes 18 extending in a first direction, and being disposed with a space in a second direction crossing the first direction, more specifically, orthogonal to the second direction. In FIG. 2 and later-described FIG. 3, the number of the sub-electrodes is less than the actual number, and accordingly, the length of each of the sub-electrodes is illustrated to be short. However, the number of the sub-electrodes is dozens or more, or even hundreds in actuality.

As illustrated in FIG. 3, the second capacitance detection electrode 11 has plural second capacitance detection sub-electrodes 19 on the upper main surface 13 of the piezoelectric film 3, the second capacitance detection sub-electrodes 19 extending in the second direction and being disposed with a space in the first direction.

As illustrated in FIG. 3, the first piezoelectric voltage detection electrode 12 has plural first piezoelectric voltage detection sub-electrodes 20 on the upper main surface 13 of the piezoelectric film 3, the first piezoelectric voltage detection sub-electrodes 20 extending in the second direction and being disposed between the plural second capacitance detection sub-electrodes 19.

As illustrated in FIG. 4, the second piezoelectric voltage detection electrode 17 is formed on the almost entire surface of the lower main surface 14 of the piezoelectric film 4. The second piezoelectric voltage detection electrode 17 is composed of one electrode opposing all of the plural first piezoelectric voltage detection sub-electrodes 20.

As illustrated in FIG. 2, each of the first capacitance detection sub-electrodes 18 includes plural wide parts 21 and plural narrow parts 22, which are alternately formed continuous. On the other hand, as illustrated in FIG. 3, each of the second capacitance detection sub-electrodes 19 also has plural wide parts 23 and plural narrow parts 24, which are alternately formed continuous. As understood with reference to both FIGS. 2 and 3 or to FIG. 1, the narrow parts 22 of the first capacitance detection sub-electrode 18 and the narrow parts 24 of the second capacitance detection sub-electrode 19 are located to be opposite to each other via the dielectric film 2.

As understood with reference to both FIGS. 2 and 3 or to FIG. 5, this configuration can prevent the wide parts 21 and 23, having a wider area, of the first capacitance detection sub-electrode 18 and the second capacitance detection sub-electrode 19 from being superimposed with each other as viewed from a direction orthogonal to the operation surface. With this configuration, when an operator touches the operation surface with his/her finger or the like, a change in capacitance caused by a change in a dielectric constant is likely to occur in the vicinity of the operation surface, whereby detection sensitivity of a touch position can be enhanced.

As illustrated in FIG. 3, each of the first piezoelectric voltage detection sub-electrodes 20 has plural wide parts 25 and plural narrow parts 26, which are alternately formed continuous. The wide part 25 of the first piezoelectric voltage detection sub-electrode 20 is located between the narrow parts 24 of the adjacent second capacitance detection sub-electrodes 19. As a result, as illustrated in FIG. 5 and as understood from both FIGS. 2 and 3, the wide part 21 of the first capacitance detection sub-electrode 18 and the wide part 25 of the first piezoelectric voltage detection sub-electrode 20 are located to be opposite to each other via the dielectric film 2.

With the above configuration, necessary electrodes can efficiently be disposed on the dielectric film 2 and the piezoelectric film 3 which have a limited area. Also, as understood from FIG. 5, a presence of any electrode that can affect the generation of capacitance, such as the first piezoelectric voltage detection electrode 12, between the first capacitance detection sub-electrode 18 and the second capacitance detection sub-electrode 19 can be prevented.

In the above first capacitance detection sub-electrode 18, the second capacitance detection sub-electrode 19, and the first piezoelectric voltage detection sub-electrode 20, the wide parts 21, 23, and 25 have a shape of generally a parallelogram, and the narrow parts 22, 24, and 26 have a shape of connecting the corners of the plural parallelogram-shaped wide parts 21, 23, and 25 in a direction of a diagonal. Especially in the illustrated embodiment, the wide parts 21, 23, and 25 have a shape of generally a square that is a typical example of a parallelogram.

According to the above configuration, the necessary electrodes can more efficiently be disposed, and further, the second capacitance detection sub-electrodes 19 and the first piezoelectric voltage detection sub-electrodes 20, which are disposed between the dielectric film 2 and the piezoelectric film 3, can be formed almost without a gap as illustrated in FIG. 3.

Next, a method of detecting a touch position and a pressing amount on the touch panel 1 will be described.

Figure 1:
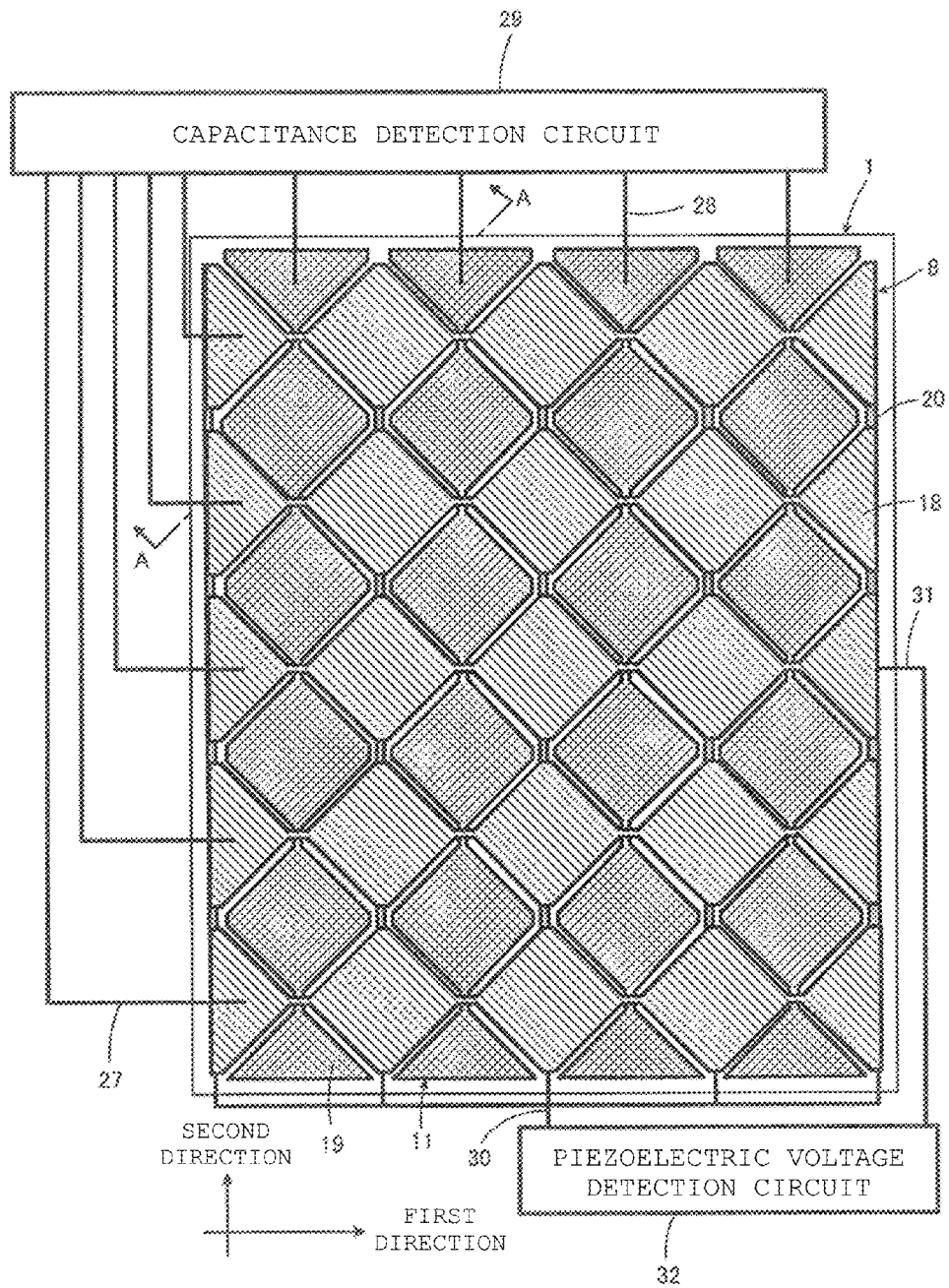
FIG. 1 is a plan view illustrating a touch panel 1 according to one embodiment of the present invention, wherein a first capacitance detection electrode 8 and a second capacitance detection electrode 11 are seen through, and a capacitance detection circuit 29 and a piezoelectric voltage detection circuit 32 are illustrated by a block diagram.

As illustrated in FIG. 1, plural conductive lines 27 connected to each of the plural first capacitance detection sub-electrodes 18 and plural conductive lines 28 connected to each of the plural second capacitance detection sub-electrodes 19 are respectively connected to a capacitance detection circuit 29. Though FIG. 1 does not directly illustrate the connection state, a conductive line 30 commonly connected to the plural first piezoelectric voltage detection sub-electrodes 20 and a conductive line 31 connected to the second piezoelectric voltage detection electrode 17 are connected to a piezoelectric voltage detection circuit 32.

Firstly, a touch position is detected according to the following principle. The configuration in the present embodiment employs a concept of detecting a touch position based on a projected mutual capacitance system.

A drive signal is applied between the first capacitance detection sub-electrode 18 and the second capacitance detection sub-electrode 19 via the conductive lines 27 and 28. When an operator touches a predetermined position on the upper main surface 6 of the upper protection film 4 with his/her finger in this state, a part of an electric field at the touch position is induced to the finger. With this, capacitance is changed at the touch position, compared to the case where the position is not touched with the finger. Therefore, the touch with the finger can be detected by detecting the change in capacitance by the capacitance detection circuit 29.

Since the plural first capacitance detection sub-electrodes 18 extend in the first direction and are disposed at a predetermined space along the second direction, and the plural second capacitance detection sub-electrodes 19 extend in the second direction and are disposed at a predetermined space along the first direction as described above, a position where the first capacitance detection sub-electrodes 18 and the second capacitance detection sub-electrodes 19 are opposite to each other via the dielectric film 2, in other words, a position where a current for detection is flown due to the generation of an electric field, can be detected from a two-dimensional coordinate from a combination of a specific first capacitance detection sub-electrode 18 and a specific second capacitance detection sub-electrode 19 forming the opposite position.

For example, when an operator touches the vicinity of an opposite position where the specific first capacitance detection sub-electrode 18(A) illustrated in FIG. 2 and the specific second capacitance detection sub-electrode 19(A) illustrated in FIG. 3 are opposite to each other, an electric field is changed near the opposite position, whereby a current flowing from the first capacitance detection sub-electrode 18(A) through the second capacitance detection sub-electrode 19(A) is changed. In this case, an electric field is not changed, and hence, a current is not changed at any other opposite positions. A touch position can be detected by using this principle.

A touch position may be detected not by the above projected mutual capacitance system but by a projected self-capacitance system.

Next, a detection principle as to whether a pressing operation is inputted or not and of a pressing amount will be described. It is supposed that both ends of the touch panel 1 in the first direction are fixed. It is also supposed that the stretching direction of the PLLA film forming the piezoelectric film 3 is at an angle of almost 45 degrees to each side of the piezoelectric film 3.

When an operator presses a predetermined position on the upper main surface 6 of the upper protection film 4 with his/her finger, the piezoelectric film 3 stretches almost along the first direction, so that tensile stress is generated on the piezoelectric film 3. Due to this stress, the piezoelectric film 3 is polarized in the upper main surface 13 and the lower main surface 14.

Since the first piezoelectric voltage detection electrode 12 is formed on the upper main surface 13 of the piezoelectric film 3, and the second piezoelectric voltage detection electrode 17 is formed on the lower main surface 14 as described above, a potential difference is generated between the first piezoelectric voltage detection electrode 12 and the second piezoelectric voltage detection electrode 17. Therefore, a press with a finger, in other words, whether a pressing operation with a touch by a finger is performed or not, can be detected by detecting this potential difference, i.e., a piezoelectric voltage, by the piezoelectric voltage detection circuit 32.

It has been known that, according to PLLA forming the piezoelectric film 3, a detection voltage (piezoelectric voltage) is linearly changed depending on a pressing amount. Accordingly, a pressing amount can be detected by measuring a detection voltage value by the piezoelectric voltage detection circuit 32. Specifically, whether an operator lightly touches the operation surface or strongly presses the operation surface can correctly be detected.

As for the detection of pressing, both ends of the touch panel 1 in the first direction are fixed in the above description. However, in the case where both ends in the first direction and both ends in the second direction are both fixed, detection voltages generated at the respective positions of the second piezoelectric voltage detection electrode 17 might be offset. In order to prevent this situation, the second piezoelectric voltage detection electrode 17 is preferably divided as illustrated in FIGS. 6 to 8, for example.

Figure 6:
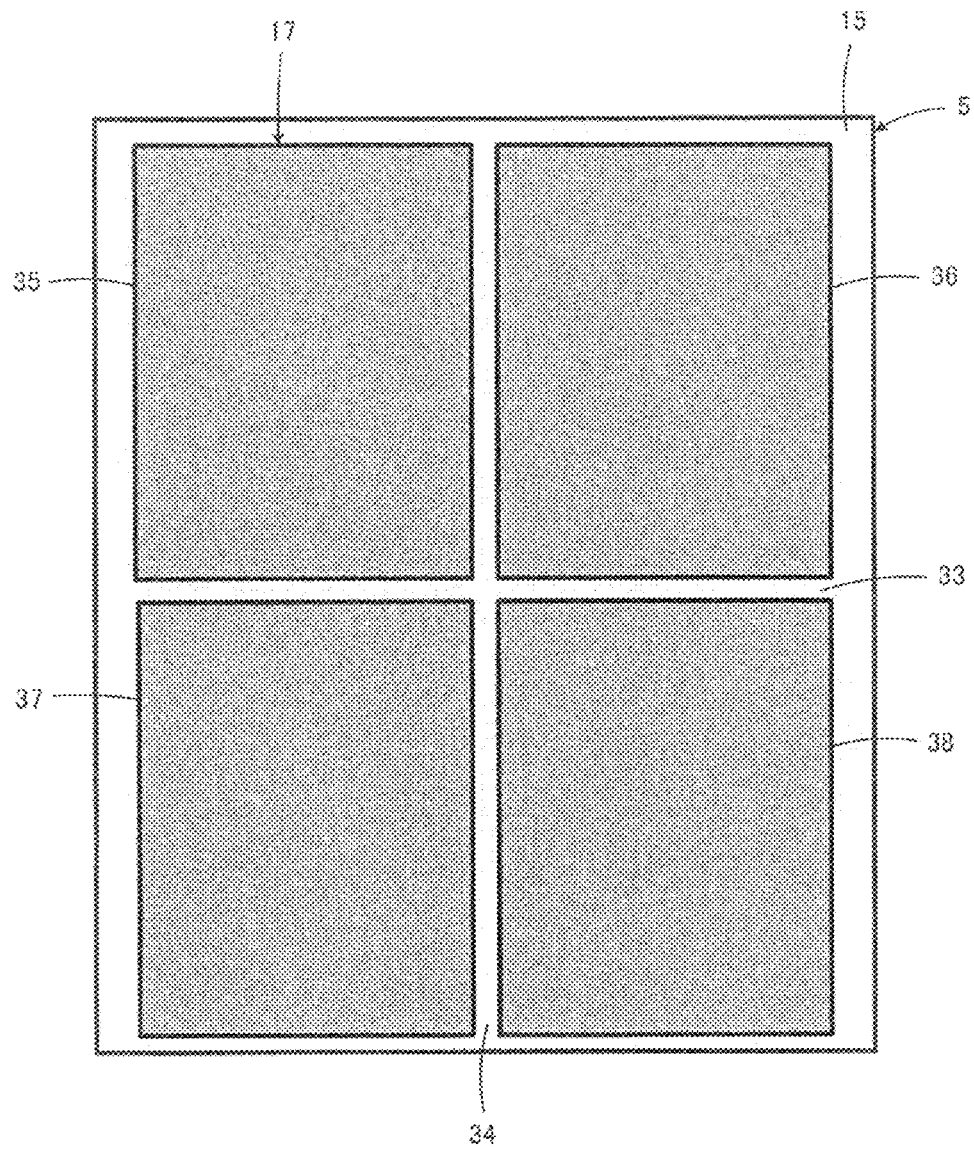
FIG. 6 is a plan view illustrating a first modification of the second piezoelectric voltage detection electrode 17 illustrated in FIG. 4.

The second piezoelectric voltage detection electrode 17 illustrated in FIG. 6 is divided into four second piezoelectric voltage detection sub-electrodes 35 to 38 by a gap 33 extending in the first direction and a gap 34 extending in the second direction.

Figure 7:
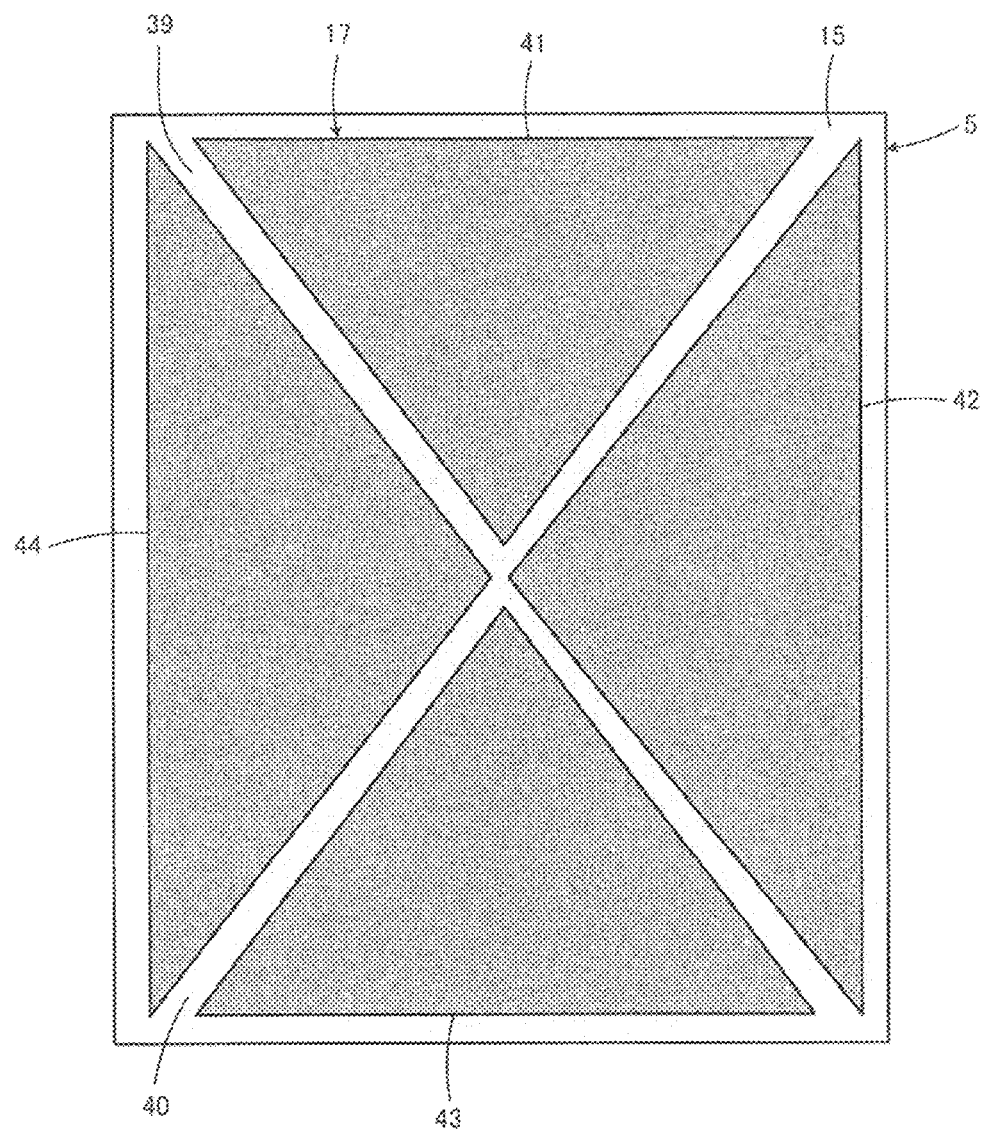
FIG. 7 is a plan view illustrating a second modification of the second piezoelectric voltage detection electrode 17 illustrated in FIG. 4.

The second piezoelectric voltage detection electrode 17 illustrated in FIG. 7 is divided into four second piezoelectric voltage detection sub-electrodes 41 to 44 by gaps 39 and 40 extending in a direction of a diagonal.

Figure 8:
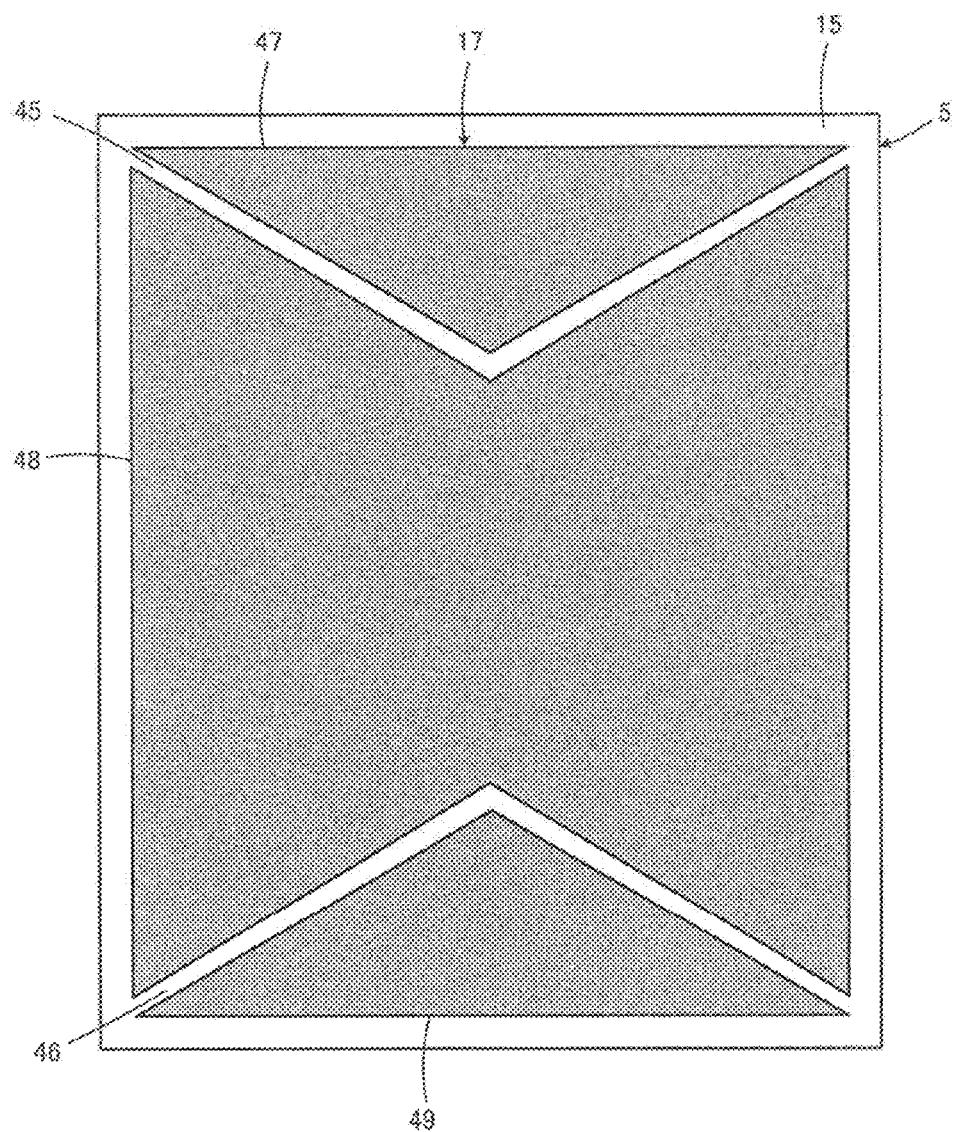
FIG. 8 is a plan view illustrating a third modification of the second piezoelectric voltage detection electrode 17 illustrated in FIG. 4.

The second piezoelectric voltage detection electrode 17 illustrated in FIG. 8 is divided into three second piezoelectric voltage detection sub-electrodes 47 to 49 by gaps 45 and 46 extending in a V shape.

With the configurations illustrated in FIGS. 6 to 8, an offset of detection voltages can be difficult to occur even if both ends of the touch panel 1 in the first direction and both ends in the second direction are both fixed. This is because, from a viewpoint of one region where each of the second piezoelectric voltage detection sub-electrodes 35 to 38, 41 to 44, and 47 to 49 is formed, not all perimeters are fixed.

The second piezoelectric voltage detection electrode 17 is not necessarily formed on the entire surface of the touch panel 1, and it may be formed on only a portion where charges are easy to be generated. Alternatively, an electrode on a portion other than a portion where charges are easy to be generated may be used as a ground electrode.

Figure 9:
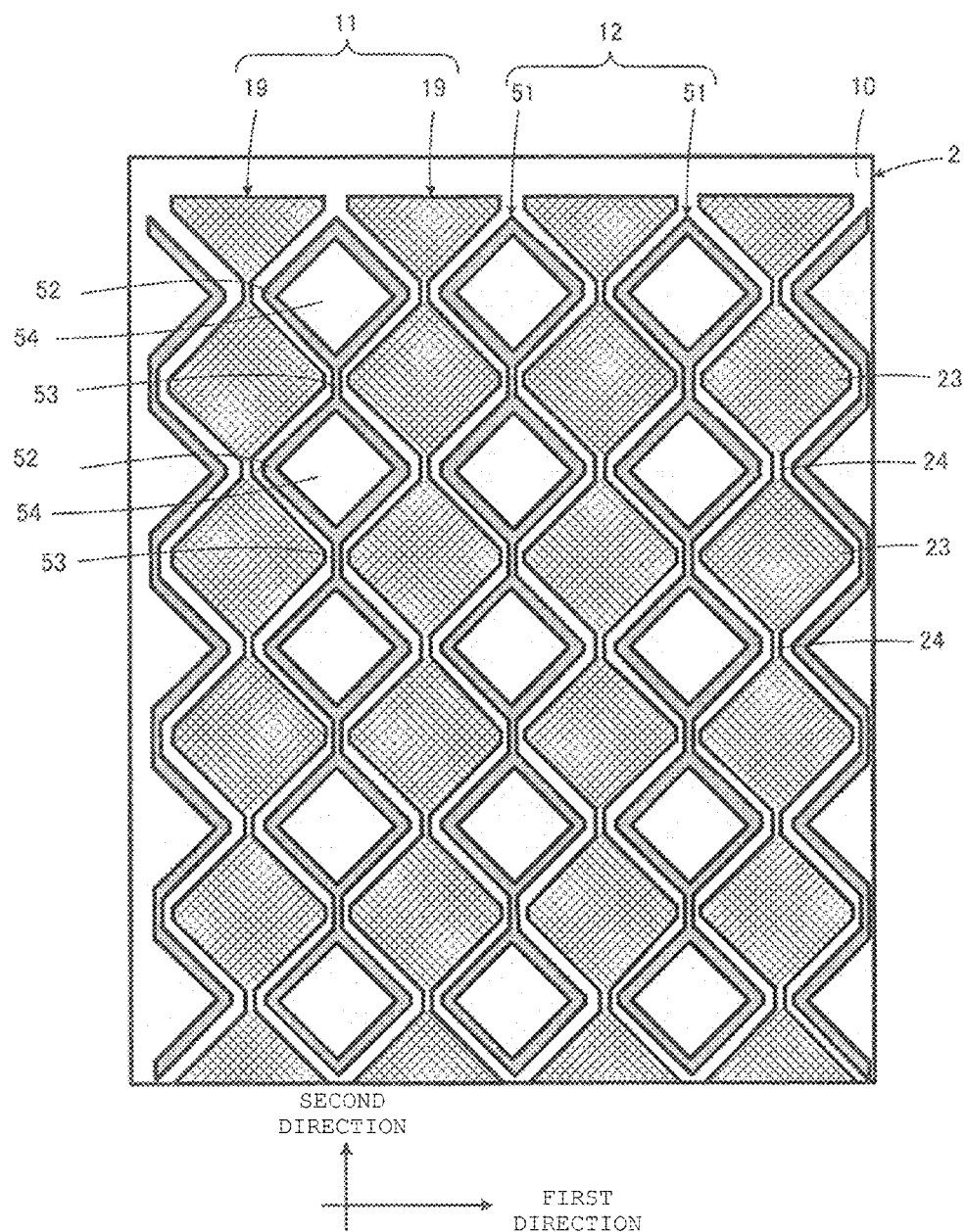
FIG. 9 is a plan view corresponding to FIG. 3 and illustrating a first modification of the first piezoelectric voltage detection electrode 12.

FIG. 9 corresponding to FIG. 3 illustrates a first modification of the first piezoelectric voltage detection electrode 12. The components in FIG. 9 same as those illustrated in FIG. 3 are identified by the same numerals, and the redundant description will not be repeated.

Referring to FIG. 9, each of plural first piezoelectric voltage detection sub-electrodes 51 forming the first piezoelectric voltage detection electrode 12 has plural wide parts 52 and plural narrow parts 53 that are alternately formed continuous. The outer shape of the first piezoelectric voltage detection sub-electrode 51 is similar to the outer shape of the first piezoelectric voltage detection sub-electrode 20. The first piezoelectric voltage detection sub-electrode 51 includes an island region 54 where no electrode is disposed on the wide part 52. Since the first piezoelectric voltage detection sub-electrode 51 is formed to be opposite to the first capacitance detection sub-electrode 18 (see FIG. 2), a light transmittance of this portion is improved due to the reduced number of superimposed electrode layers.

Figure 10:
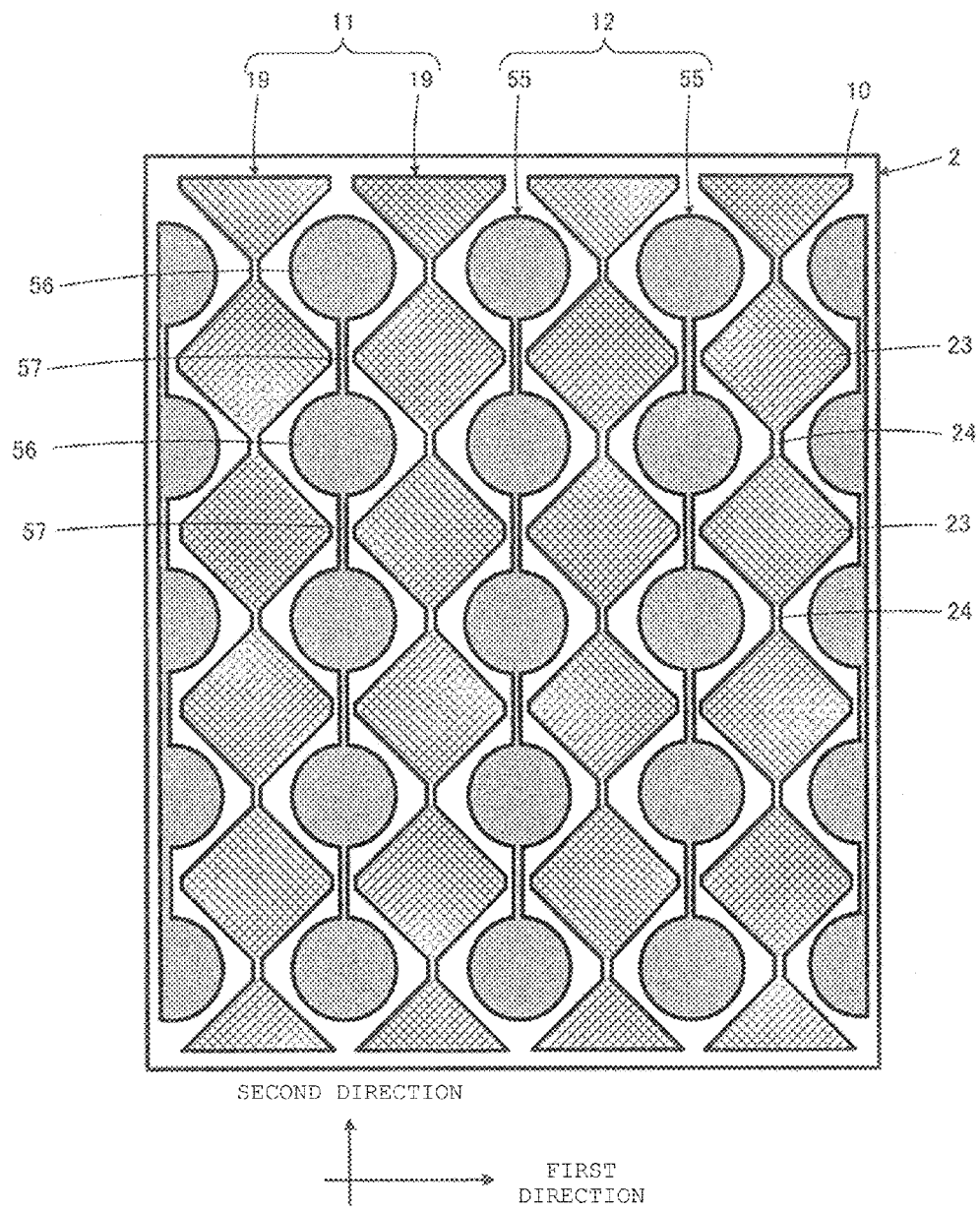
FIG. 10 is a plan view corresponding to FIG. 3 and illustrating a second modification of the first piezoelectric voltage detection electrode 12.

FIG. 10 corresponding to FIG. 3 illustrates a second modification of the first piezoelectric voltage detection electrode 12. The components in FIG. 10 same as those illustrated in FIG. 3 are identified by the same numerals, and the redundant description will not be repeated.

In FIG. 3 and above FIG. 9, the outer shapes of the wide parts 25 and 52 of the first piezoelectric voltage detection sub-electrodes 20 and 51 are almost equal to that of the wide part 21 of the first capacitance detection sub-electrode 18 (see FIG. 2). However, the outer shape of the first piezoelectric voltage detection sub-electrode is not necessarily almost equal to the outer shape of the wide part of the first capacitance detection sub-electrode. The outer shape of the wide part of the first piezoelectric voltage detection sub-electrode may be any shape such as a circular shape or a polygonal shape, so long as it satisfies the above condition. Each of the plural first piezoelectric voltage detection sub-electrodes 55 illustrated in FIG. 10 forming the first piezoelectric voltage detection electrode 12 has plural wide parts 56 and plural narrow parts 57 that are alternately formed continuous, wherein the outer shape of the wide part 56 is circular.

In the case where generated charges are enough for the detection circuit upon the detection by the piezoelectric voltage detection circuit 32, the first piezoelectric voltage detection sub-electrode may have a simple linear shape having no wide parts. Specifically, the first piezoelectric voltage detection sub-electrode may have a simple linear shape with a width same as the width of the narrow part.

Figure 11:
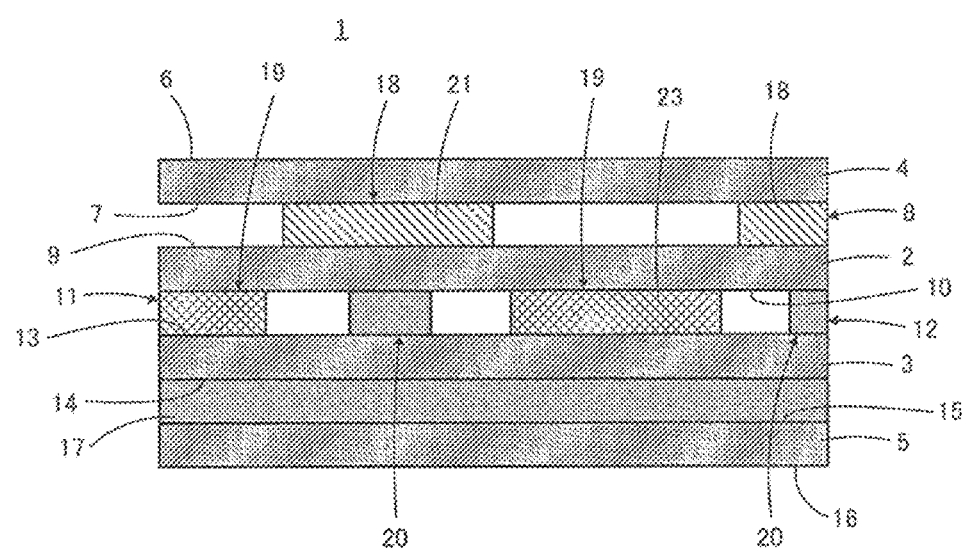
FIG. 11 is a sectional view corresponding to FIG. 5 and especially illustrating a modification of the first piezoelectric voltage detection sub-electrodes 20.

FIG. 11 corresponding to FIG. 5 especially illustrates a modification of the first piezoelectric voltage detection sub-electrode 20. The components in FIG. 11 same as those illustrated in FIG. 5 are identified by the same numerals, and the redundant description will not be repeated.

Referring to FIG. 11, the portion opposite to the wide part 21 of the first capacitance detection sub-electrode 18 in the first piezoelectric voltage detection sub-electrode 20 is located in a region narrower than the region of the wide part 21 of the first capacitance detection sub-electrode 18 as perspectively viewed. This configuration can allow any electrode that can affect the generation of capacitance, such as the first piezoelectric voltage detection electrode 12, to be more apart from between the first capacitance detection sub-electrode 18 and the second capacitance detection sub-electrode 19.

It can be understood that the modification illustrated in FIG. 11 graphically illustrates the above case in which each of the first piezoelectric voltage detection sub-electrodes has a simple linear shape without having wide parts. However, the first piezoelectric voltage detection sub-electrode 18 may have plural wide parts and plural narrow parts that are alternately formed continuous also in the modification illustrated in FIG. 11.

DESCRIPTION OF REFERENCE SYMBOLS

1 TOUCH PANEL
2 DIELECTRIC FILM
3 PIEZOELECTRIC FILM
4, 5 PROTECTION FILM
6, 7, 9, 10, 13, 14, 15, 16 MAIN SURFACE
8 FIRST CAPACITANCE DETECTION ELECTRODE
11 SECOND CAPACITANCE DETECTION ELECTRODE
12 FIRST PIEZOELECTRIC VOLTAGE DETECTION ELECTRODE
17 SECOND PIEZOELECTRIC VOLTAGE DETECTION ELECTRODE
18 FIRST CAPACITANCE DETECTION SUB-ELECTRODE
19 SECOND CAPACITANCE DETECTION SUB-ELECTRODE
20, 51, 54 FIRST PIEZOELECTRIC VOLTAGE DETECTION SUB-ELECTRODE
21, 23, 25, 52, 56 WIDE PART
22, 24, 26, 53, 56 NARROW PART
29 CAPACITANCE DETECTION CIRCUIT
32 PIEZOELECTRIC VOLTAGE DETECTION CIRCUIT

The invention claimed is:

1. A touch panel comprising:
a dielectric film having a first main surface and a second main surface, which are opposite to each other;
a piezoelectric film having a third main surface and a fourth main surface, which are opposite to each other, the piezoelectric film being superimposed on the dielectric film with the third main surface and the second main surface being opposite to each other;
a first capacitance detection electrode disposed on the first main surface;
a second capacitance detection electrode disposed between the second main surface and the third main surface, the second capacitance detection electrode being paired with the first capacitance detection electrode;
a first piezoelectric voltage detection electrode disposed between the second main surface and the third main surface; and
a second piezoelectric voltage detection electrode disposed on the fourth main surface, the second piezoelectric voltage detection electrode being paired with the first piezoelectric voltage detection electrode, wherein
the first capacitance detection electrode includes plural first capacitance detection sub-electrodes that extend in a first direction and are disposed with a space therebetween,
the second capacitance detection electrode includes plural second capacitance detection sub-electrodes that extend in a second direction orthogonal to the first direction and are disposed with a space therebetween,
the first piezoelectric voltage detection electrode includes plural first piezoelectric voltage detection sub-electrodes that extend in the second direction and are disposed alternately between the plural second capacitance detection sub-electrodes, and
the second piezoelectric voltage detection electrode has a shape opposing the first piezoelectric voltage detection electrode via the piezoelectric film.

2. The touch panel according to claim 1, wherein the first capacitance detection sub-electrode and the second capacitance detection sub-electrode both have a shape including plural wide parts and plural narrow parts, which continuously alternate, the narrow parts of the first capacitance detection sub-electrode and the narrow parts of the second capacitance detection sub-electrode opposing each other via the dielectric film.

3. The touch panel according to claim 2, wherein a portion of the first piezoelectric voltage detection sub-electrode is located in a first region narrower than a second region of the wide part of the first capacitance detection sub-electrode, the portion opposing the wide part of the first capacitance detection sub-electrode.

4. The touch panel according to claim 3, wherein the first piezoelectric voltage detection sub-electrode has a shape including plural wide parts and plural narrow parts, which continuously alternate, and the wide parts of the first piezoelectric voltage detection sub-electrode are located between the narrow parts of the adjacent second capacitance detection sub-electrodes, whereby the wide parts of the first capacitance detection sub-electrode and the wide parts of the first piezoelectric voltage detection sub-electrode oppose each other via the dielectric film.

5. The touch panel according to claim 4, wherein the wide parts of the first piezoelectric voltage detection sub-electrode include a portion containing no electrode.

6. The touch panel according to claim 5, wherein the wide parts have a parallelogram shape, and the narrow parts have a shape that connects corners of the plural parallelogram-shaped wide parts in a direction of a diagonal, in each of the first capacitance detection sub-electrode, the second capacitance detection sub-electrode, and the first piezoelectric voltage detection sub-electrode.

7. The touch panel according to claim 4, wherein the wide parts have a parallelogram shape, and the narrow parts have a shape that connects corners of the plural parallelogram-shaped wide parts in a direction of a diagonal, in each of the first capacitance detection sub-electrode, the second capacitance detection sub-electrode, and the first piezoelectric voltage detection sub-electrode.

8. The touch panel according to claim 2, wherein the first piezoelectric voltage detection sub-electrode has a shape including plural wide parts and plural narrow parts, which continuously alternate, and the wide parts of the first piezoelectric voltage detection sub-electrode are located between the narrow parts of the adjacent second capacitance detection sub-electrodes, whereby the wide parts of the first capacitance detection sub-electrode and the wide parts of the first piezoelectric voltage detection sub-electrode oppose each other via the dielectric film.

9. The touch panel according to claim 1, wherein the second piezoelectric voltage detection electrode is composed of one electrode opposing all of the plural first piezoelectric voltage detection sub-electrodes.

10. The touch panel according to claim 1, wherein the second piezoelectric voltage detection electrode is composed of plural divided second piezoelectric voltage detection sub-electrodes.

11. The touch panel according to claim 1, wherein the piezoelectric film is a polylactic acid film.

* * * * *